Nov. 7, 1939.  C. A. DONDANVILLE  2,179,146
CORN POPPER
Filed Aug. 1, 1938
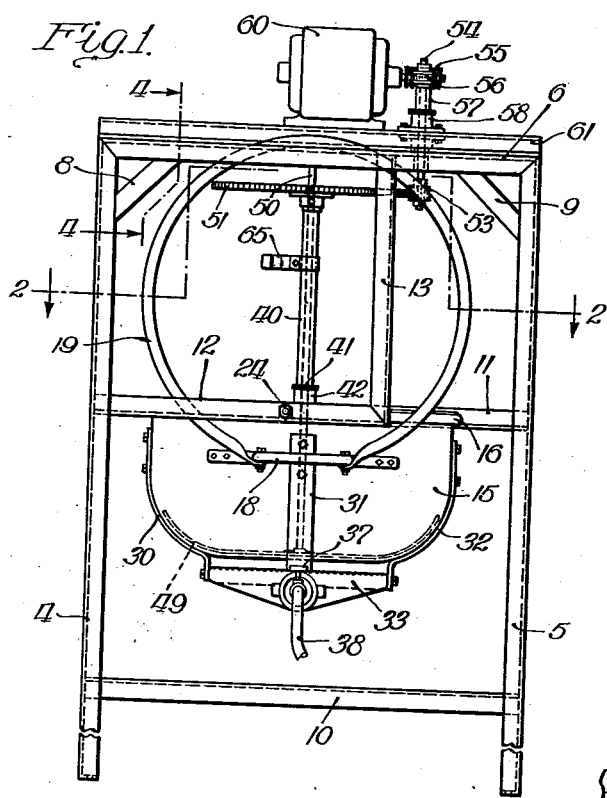
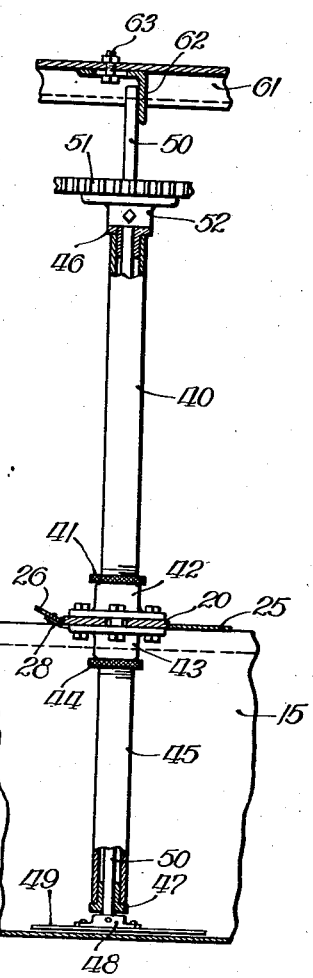
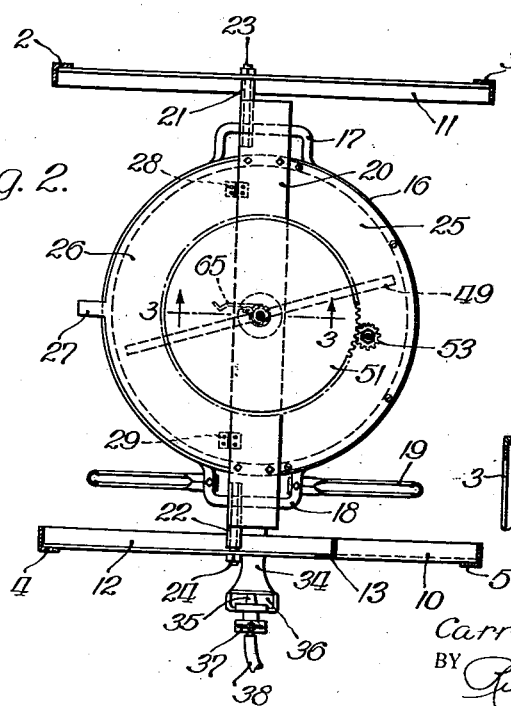
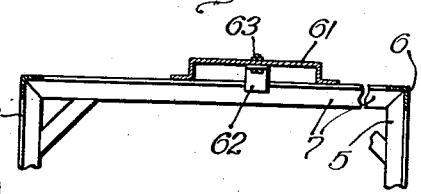
INVENTOR:
Carroll A. Dondanville
BY Richardson &c Auer
ATTORNEYS.

Patented Nov. 7, 1939

2,179,146

UNITED STATES PATENT OFFICE 2,179,146

CORN POPPER

Carroll A. Dondanville, Chicago, Ill.

Application August 1, 1938, Serial No. 222,384

10 Claims. (Cl. 53—4)

My invention relates in general to corn poppers, but more in particular to apparatus of this charter which is of large size and adapted to the manufacture of popcorn in commercial quantities. The object of the invention is to produce an improved corn popper which is of simple and rugged construction, economical to manufacture, and efficient in operation over long periods without necessity for repairs or other attention.

The invention and the various features of improvement which form a part thereof will be described hereinafter with reference to the accompanying drawing, in which—

Fig. 1 is a side view of the complete corn popper;

Fig. 2 is a section on the line 2—2, Fig. 1;

Fig. 3 is a partial section of the line 3—3, Fig. 2, showing the arrangement of the agitator drive shaft; and Fig. 4 is a partial section on the line 4—4, Fig. 1, showing the arrangement of the cross member for supporting the motor and counter shaft.

Referring to the drawing, all the various parts of the corn popper are supported on an upright rectangular frame comprising four vertical legs or posts 2, 3, 4, and 5, of angle iron, Figs. 1 and 2, which are connected together at the top by four horizontal angle iron members, such as 6 and 7, appearing in Figs. 1 and 4, respectively. Braces such as 8 and 9 may be provided at the corners. These parts may be secured together by welding. The structure is further braced by horizontal members such as 10 near the bottom, and by a pair of horizontal members 11 and 12 which serve to support the popping kettle or container. The horizontal member 11 extends between legs 2 and 3 to which it may be secured by welding. The horizontal member 12 may be welded at one end to the leg 4, but does not extend clear across the frame to the leg 5. There is provided instead a section 13, which may be formed integrally with 12 or welded thereto, and which extends vertically upward and is welded to the horizontal member 6. The purpose of this arrangement will be explained later. The legs may have feet formed at the bottom, as indicated in Fig. 1, whereby the frame can be secured to the floor.

The popping kettle or container is indicated by the reference numberal 15. This kettle may be of any suitable form, but I prefer to use a standard syrup kettle such as is used in candy making. Such a kettle is of copper, about twenty-four inches in diameter, and has a heavy curled rim 16. The handles 17 and 18 with which the kettle is provided are convenient for handling during assembly, and the handle 18 also provides means whereby the operating wheel 19 may be secured to the kettle. This arrangement is shown clearly in Figs. 1 and 2.

The mechanism for supporting the kettle or container 15 on the frame includes a heavy plate 20 which extends centrally across the top and is secured to the rim 16 by means of four small bolts. On opposite ends of plate 20 and on the under side thereof are welded two tubular bearing members 21 and 22, which are rotatable on studs 23 and 24, respectively. These studs have enlarged threaded ends which are screwed into tapped holes in the horizontal membrs 11 and 12, respectively, where they are rigidly held by nuts as shown. It will be observed that the horizontal axis on which the container is thus pivoted is to one side of a vertical line passing through the center of gravity of the container so that it has a tendency to rotate on its pivots in a clockwise direction, as seen in Fig. 1. The arrangement for maintaining it in the proper position will be explained shortly.

The portion of the container which is to the right of plate 20 in Fig. 2 is closed by a cover 25, attached to the rim 16 by means of machine screws, or in any suitable manner. On the left of plate 20 the container is closed by a cover 26 which is secured to plate 20 by means of hinges 28 and 29.

The container is heated by means of a gas burner 33, which is held in position by metal straps 30, 31, and 32. The burner may be of the usual construction and includes a mixing chamber 34, Fig. 2, gas jet 35, and air port 36. A valve is indicated at 37, and there is a flexible hose 38 leading from a source of supply.

The container is equipped with a stirrer or agitator for preventing unpopped corn from adhering to the bottom and becoming burned. This mechanism will now be described. As shown in Fig. 3, there are two pipe flanges 42 and 43 disposed above and below the plate 20 to which they are securely bolted. There is an opening in the plate in line with the openings in these pipe flanges. The pipes 40 and 45 are threaded into the flanges 42 and 43, respectively, and are prevented from loosening by lock nuts 41 and 44. The reference numberals 46 and 47 indicate bronze bushings which have a drive fit in the pipes 40 and 45, respectively, and which provide bearings for the vertical shaft 50, The latter passes centrally through the two pipes and through the opening in plate 20. At the lower end of shaft 50 there is a bracket 48 to which is secured the agitator 49. The latter is a curved metal strip conforming to the shape of the bottom of the container, as shown in dotted lines in Fig. 1. At the upper end of shaft 50 there is a gear wheel 51 having a hub 52. The gear wheel may be fixed to the shaft by means of a set screw.

It will be seen that the weight of the shaft and gear wheel assembly is supported on the upper bearing bushing 46 which is engaged by the hub 52 of gear wheel 51. At the same time the shaft is held against said movement by its upper and lower bearings in the bushings 46 and 47. These bearings have some play, and the shaft preferably runs without oil. There may be a little end play in the shaft, which is adjusted by turning the lower pipe 45 in one direction or the other, after first loosening up the lock nut 44. When the container is rotated into dumping position, the bracket 48 engages the lower bearing bushing 47, which prevents the shaft from falling out. The threaded pipes 40 and 45 also provide for raising or lowering the shaft 50 to adjust the agitator 49 with respect to the bottom of the container. Since the shaft assembly is supported on bushing 46 and on pipe 40, it is clear that the whole assembly can be raised or lowered by rotating the pipe 40 in the proper direction, pipe 45 being adjusted at the same time to maintain the proper end play. The adjustment of shaft 50 should be such that the agitator 49 bearely touches the bottom of the container, and it may even not quite reach it. Heavy contact between the agitator and the bottom of the container should be avoided, as such adjustment would result in friction and wear of the parts.

The shaft 50 is driven by a motor 60, through the medium of a counter shaft 54 and suitable speed reduction gears. The motor 60 is mounted on a channel-shaped cross member 61, shown in Figs. 1 and 4, which extends across the open top of the frame. This cross member 61 also serves to support the bearings for the countershaft 54. The arrangement here is similar to the arrangement for supporting shaft 50 which is shown in detail in Fig. 3. There are two pipe flanges such as 58 bolted to the cross member 61 above and below, and into these pipe flanges are threaded two short pieces of pipe such as 57 which carry the bearings, the latter being similar to bushings 46 and 47 associated with shaft 50. The connection between the motor and shaft 54 is a worm drive, comprising a worm 55 on the motor shaft and a worm gear 56 on the shaft 54. At the lower end of shaft 54 there is a pinion 53 which is adapted to mesh with gear 51 on shaft 50.

The weight of the container and the parts mounted thereon tends to rotate it about its pivots 23 and 24 in a clockwise direction, as seen in Fig. 1, which shows the container in popping position. In this position a stop 62, Figs. 3 and 4, is engaged by the end of shaft 50 and the container is thus maintained in position by its own weight, which holds the end of the shaft 50 against the stop. The stop 50 is secured to the cross member 61 by means of a bolt 63, and is adjustable in order that the proper meshing of gears 51 with pinion 53 may be secured.

The reference numeral 65 indicates a spring catch for holding open the hinged cover 26. This catch is clamped or otherwise secured to the pipe 40. When cover 26 is opened up fully, the tongue 27, Fig. 2, slips past the curved end of the spring catch 65 and is retained thereby until manually closed.

The operation of the corn popper will now be briefly explained. Assuming that the apparatus is in its normal position, as shown in Fig. 1, the gas may be turned on at valve 37 and lighted, thereby heating up the popping kettle or container 15. The motor 60 may also be started, suitable electrical connections having been provided for supplying power. The motor rotates the counter shaft 54 by means of the worm drive shown and described, and the latter rotates shaft 50 by means of pinion 53 and gear 51. The shaft 50 rotates the agitator 49.

The cover 26 may now be opened and a supply of unpopped corn may be poured into the container 15, together with a quantity of butter or other material for imparting the desired flavor to the corn. The cover 26 is then closed. While the corn is being heated, it is constantly stirred by the agitator 49 and danger of burning is thus avoided. In a short time the corn begins to pop, and the attendant is apprised of the fact by the noise which accompanies this phenomenon, as is well known.

When the popping is finished, the attendant proceeds to dump the popped corn preparatory to recharging the container. The dumping operation is accomplished by opening the cover 26, and by rotating the container 15 about its pivots by means of the hand wheel 19. The direction of rotation is counter clockwise, as seen in Fig. 1, and the movement is not interfered with in the least by the driving arrangement for shaft 50, as gear 51 simply becomes disengaged from pinion 53 as soon as the movement begins. The total angular movement may be 90° or more to facilitate quick and clean dumping of the popped corn, and is readily accommodated by the flexible hose through which gas is supplied to the burner. The extension of the gas burner comprising the mixing chamber 34, Fig. 2, is prevented from interfering with the rotation of the container by the arrangement previously described for supporting the pivot stud 24. Instead of extending across the frame where it would be in the path of the mixing chamber, the member 12 has one end carried on the vertical member 13, leaving a clear space in which the mixing chamber can move in the arc of a circle as the container is rotated to full dumping position.

After the popped corn has been dumped, the container may be rotated back to its normal or popping position again. To accomplish this, it is merely necessary to release the hand wheel, and the container will automatically return to normal position where it is held by the engagement of the end of shaft 50 against the stop 62. The gear 51 is at this time brought into mesh again with the pinion 53 and the rotation of shaft 50 is resumed. Another charge may now be placed in the container, and the operation is repeated.

Any desired arrangement may be provided for receiving the popped corn as it is dumped from the container, but as such arrangements form no part of the invention they are not shown herein.

It will be seen from the foregoing that I have devised an exceedingly simple and efficient corn popper, which possesses numerous advantages. While I have shown and described a certain specific embodiment, this has been done to simplify the explanation and to facilitate an understanding of the operation, and it will be understood that changes and modifications may be made without departing from the spirit of the invention. I do not therefore wish to be limited to the exact embodiment of my invention as illustrated herein, but desire to secure and have protected by Letters Patent all forms and modifications that come within the scope of the appended claims.

I claim:

1. In a corn popper, a frame, a container, means pivotally supporting said container on said frame, whereby the container may be rotated from popping to dumping position and vice versa, a shaft supported on said container, an agitator mounted on said shaft within the container, a gear mounted on said shaft outside the container, a second gear wheel adapted to be engaged by said first gear wheel when the container is in popping position and disengaged when the container is rotated toward its dumping position, and means for continuously rotating the second gear wheel independent of the position of said container.

2. In a corn popper, a frame, a container having popping and dumping positions, means for eccentrically pivoting said container on said frame so that the weight of the container tends to rotate it on its pivot from dumping to popping position and beyond, an agitator inside said container, a shaft for driving said agitator, and means including said shaft for preventing the container from rotating past its popping position.

3. In a corn popper, a frame, a container, an agitator inside said container, a drive shaft for said agitator extending outside the container, a gear on said drive shaft, a power shaft having a gear for meshing with said first gear, and means for eccentrically pivoting said container on said frame so that the weight of the container is effective to maintain said gears in engagement with each other.

4. In a corn popper, a frame, a container, an agitator inside said container, a drive shaft for said agitator extending outside the container, a gear on said drive shaft, a power shaft having a gear for meshing with said first gear, means for eccentrically pivoting said container on said frame so that the weight of the container is effective to maintain said gears in engagement with each other, and stop means effective to prevent over-engagement of said gears.

5. In a corn popper, a container, a horizontal cross member secured to the rim of said container, a vertical shaft extending down through an opening in said cross member, an agitator secured to the end of said shaft at the bottom of the container, a gear wheel mounted on the opposite end of said shaft, and a tubular member surrounding said shaft between the cross member and gear wheel, said tubular member being secured to the cross member and engaged by the hub of said gear wheel to support the weight of the gear wheel and shaft.

6. A corn popper as set forth in claim 5, characterized by the provision of means for vertically adjusting said tubular member to raise or lower the shaft for adjusting the agitator with respect to the bottom of the container.

7. A corn popper as set forth in claim 5, characterized by the provision of pivotal supporting means for the container whereby the same can be rotated from popping to dumping position and vice versa, and by the provision of means between the cross member and the agitator to prevent the shaft and agitator from becoming displaced when the container is rotated to dumping position.

8. In a corn popper, a frame, a container within said frame, a gas burner beneath said container and suspended thereon, said burner including a mixing chamber extending outside the frame, a pivot for the container on the side opposite said mixing chamber, a support for said pivot forming part of the frame, a second pivot for the container on the side where said mixing chamber is located, and a support for said second pivot also forming part of the frame but arranged to leave a clear space in the side of the frame in which the said mixing chamber can move in the arc of a circle when said container is rotated on its pivots.

9. In a corn popper, a frame comprising four upright members secured together at the top at the corners of a rectangle, a container within said frame, a horizontal cross member secured to the rim of said container and extending beyond the same on each side, tubular bearing members secured to opposite ends of said cross member, supporting studs entering said bearing member, and means secured to the frame on opposite sides of the container for rigidly supporting said studs.

10. A corn popper as set forth in claim 9, in which the bearing members are located to one side of the diameter of the casing which is parallel to and bisects said cross member.

CARROLL A. DONDANVILLE.